US011920373B2

(12) United States Patent
Kim et al.

(10) Patent No.: US 11,920,373 B2
(45) Date of Patent: Mar. 5, 2024

(54) DOOR OUTSIDE HANDLE ASSEMBLY HAVING SLIDING TYPE DOOR LOCK CAP

(71) Applicants: Hyundai Motor Company, Seoul (KR); Kia Corporation, Seoul (KR)

(72) Inventors: Hong-Mi Kim, Ulsan (KR); Myeong-Rok Choi, Pyeongtaek-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 20 days.

(21) Appl. No.: 17/581,114

(22) Filed: Jan. 21, 2022

(65) Prior Publication Data

US 2022/0396972 A1 Dec. 15, 2022

(30) Foreign Application Priority Data

Jun. 15, 2021 (KR) ........................ 10-2021-0077529

(51) Int. Cl.
*E05B 17/18* (2006.01)
*E05B 85/10* (2014.01)

(52) U.S. Cl.
CPC ............ *E05B 17/186* (2013.01); *E05B 85/10* (2013.01)

(58) Field of Classification Search
CPC ........ E05B 17/14; E05B 17/18; E05B 17/186; E05B 1/003; E05B 1/0038; E05B 1/0046; E05B 1/0053; E05B 3/00; E05B 7/00; E05B 85/06; E05B 85/10; E05B 85/14; E05B 77/34
See application file for complete search history.

(56) References Cited

U.S. PATENT DOCUMENTS 7,437,803 B2 * 10/2008 Watanabe ............... E05B 85/16 292/336.3
10,145,152 B2 * 12/2018 Beck ....................... E05B 17/14
10,246,901 B2 * 4/2019 Edwards ................. E05B 81/90
2010/0162777 A1 * 7/2010 Savant .................. E05B 17/186 70/101

FOREIGN PATENT DOCUMENTS

EP 3128108 A1 * 2/2017 ............. E05B 17/14
KR 2011138123 A * 12/2011
KR 2013122126 A * 11/2013
KR 20130122126 A 11/2013
KR 2020069930 A * 6/2020 ................ B60J 5/04
WO WO-2021009294 A1 * 1/2021 ............. E05B 77/44

OTHER PUBLICATIONS

Machine translation of Description of KR20200069930 (Year: 2020).*
Machine translation of description of WO2021009294 (Year: 2021).*

* cited by examiner

*Primary Examiner* — Christine M Mills
*Assistant Examiner* — Christopher F Callahan
(74) *Attorney, Agent, or Firm* — Slater Matsil, LLP

(57) ABSTRACT

An embodiment door outside handle assembly includes a door lock body configured to be attached to an outside of a door panel of a vehicle, a grip cover covering an outside of the door lock body and including a key hole configured to receive an emergency key, and a door lock cap on an outside of the grip cover, the door lock cap being slidable in a longitudinal direction of the vehicle to cover or uncover the key hole.

19 Claims, 17 Drawing Sheets

DOOR OUTSIDE HANDLE ASSEMBLY HAVING SLIDING TYPE DOOR LOCK CAP

CROSS-REFERENCE TO RELATED APPLICATIONS

This application claims the benefit of Korean Patent Application No. 10-2021-0077529, filed on Jun. 15, 2021, which application is hereby incorporated herein by reference.

TECHNICAL FIELD

The present disclosure relates to a door outside handle assembly having a sliding type door lock cap.

BACKGROUND

A door outside handle assembly for opening a door of a vehicle from the outside is installed on the door of the vehicle.

In the door outside handle assembly according to an exemplary embodiment of the related art illustrated in FIGS. 1A, 1B and 2, when a user pulls a grip cover 122 installed to protrude from a door panel 110, the door is opened. Generally, the door is locked or unlocked using a smart key, but in case of emergency such as battery fully discharged, the door is locked or unlocked in a mechanical method by separating an emergency key coupled to the smart key from the smart key.

To lock or unlock the door with the emergency key, the door is locked or unlocked by removing a door lock cap 123 installed on the door outside handle assembly, and then operating a door lock 121 with the emergency key.

Since the door lock cap 123 is fixed to the grip cover 122 using a hook 122*a* (see FIG. 2), the hook 122*a* is pressed by the emergency key, and then the door lock cap 123 is removed.

However, when the door lock cap 123 is removed, the door lock cap 123 is mechanically separated from the grip cover 122 and the door lock, and therefore, may be lost, and damaged in the process of removing the door lock cap 123. Further, when a force is applied to detach the door lock cap 123, the door lock cap 123 is deformed, and the deformed door lock cap 123 does not exert the same fastening force as an initial fastening force and therefore, may be separated.

FIGS. 3A, 3B and 4 illustrate a door outside handle assembly according to another exemplary embodiment of the related art. The door outside handle assembly having a grip cover 222, a door lock 221, and the like installed on a door panel 210 includes a door lock cap 223 to be opened in case of emergency such as battery fully discharged and then the door lock 221 may be locked or unlocked using an emergency key instead of a smart key. Since the door lock cap 223 is fixed to the grip cover 222 by a button, the door lock cap 223 is opened after a button 221*a* is pressed by the emergency key or the like, and then the door lock 221 is operated by the emergency key to lock or unlock the door.

Likewise, even in this type of the door outside handle assembly, there is a problem in that the door lock cap 223 may be highly lost or damaged in the state where the door lock cap 223 is opened.

The contents described in this section are to help the understanding of the background of the present disclosure, and may include what is not previously known to those skilled in the art to which the present disclosure pertains.

SUMMARY

The present disclosure relates to a door outside handle assembly having a sliding type door lock cap. Particular embodiments relate to a door outside handle assembly having a sliding type door lock cap, which is fastened in a sliding method to prevent a door lock cap from being separated even if a user operates a lock with an emergency key in case of emergency.

Embodiments of the present disclosure can solve problems associated with the related art, and an embodiment of the present disclosure provides a door outside handle assembly having a sliding type door lock cap, which has a door lock cap installed thereon in a sliding method to prevent the door lock cap from being separated from a door outside handle assembly even if the door lock cap is opened to open a door using an emergency key.

A door outside handle assembly having a sliding type door lock cap according to embodiments of the present disclosure includes a door lock body attached to an outside of a door panel of a vehicle, a grip cover formed with a key hole through which an emergency key passes and covering an outside of the door lock body, and a door lock cap installed on an outside of the grip cover to be slidable in a longitudinal direction of the vehicle to open or close the key hole.

A slot is formed in a section where the key hole is formed on the grip cover, and a locking hook inserted into the slot and forcing the door lock cap to cover the grip cover is formed on the door lock cap.

The door lock cap surrounds the grip cover, and upper and lower ends of the door lock cap are fitted into and fixed to the slot.

The slot is formed by a predetermined length in the longitudinal direction of the vehicle.

The slot is formed in each of upper and lower portions of the grip cover, and the locking hook is formed on each of upper and lower ends of the door lock cap.

The door lock cap maintains a state where the locking hook is locked to the slot, after the locking hook slides in the slot to open the key hole.

The grip cover includes a main grip cover assembled to an outside of a lower portion of the door lock body to cover the lower portion of the door lock body, and a sub grip cover assembled on an upper portion of the main grip cover, and covering an upper portion of the door lock body.

The slot is formed in the main grip cover, and the door lock cap is coupled to the main grip cover.

The slot is formed in each of upper and lower portions of the main grip cover, and the locking hook is formed on each of upper and lower ends of the door lock cap.

An upper surface of the door lock cap contacts a bottom surface of the sub grip cover.

The door outside handle assembly further includes a cap button installed on the door lock body to be slidable in a direction different from the sliding direction of the door lock cap, in order to constrain the sliding of the door lock cap, and a button spring installed between the door lock body and the cap button to elastically support the cap button.

The cap button is installed on the door lock body to be slidable vertically.

A button hole into which the cap button is inserted is formed in a lower surface of the door lock cap, and when the door lock cap closes the key hole, the cap button is inserted into the button hole.

The door panel is provided with a housing, and the door lock body is fastened to the housing.

Meanwhile, a door outside handle assembly having a sliding type door lock cap according to embodiments of the present disclosure includes a door lock body attached to an outside of a door panel of a vehicle, a grip cover formed with a key hole through which an emergency key passes and covering an outside of the door lock body, and a door lock cap installed on an outside of the grip cover to be slidable in a longitudinal direction of the vehicle to open or close the key hole, in which the door lock cap is installed to be slidable only in a predetermined section of the grip cover.

A slot is formed by a predetermined length in the longitudinal direction of the vehicle in a section where the key hole is formed in the grip cover, and a locking hook inserted into the slot to force the door lock cap to cover the grip cover is formed on the door lock cap.

The door lock cap maintains a state where the locking hook is locked to the slot, after the locking hook slides in the slot to open the key hole.

According to the door outside handle assembly having the sliding type door lock cap having the above configuration, if the door is opened using the emergency key, the door lock cap is opened in the sliding method but is not separated, such that the door lock cap may not be lost or damaged.

Further, since the door lock cap is slidable by pressing the cap button when the key hole is opened by the door lock cap, the external force applied to the hook of the door lock cap for detaching the door lock cap may be gone, thereby preventing the door lock cap from being deformed.

Further, when the key hole is closed by the door lock cap, as the cap button is inserted into the button hole formed in the door lock cap, the 'click' sound may occur, thereby easily recognizing the assembly completion of the door lock cap.

DETAILED DESCRIPTION OF ILLUSTRATIVE EMBODIMENTS

Figure 1A:
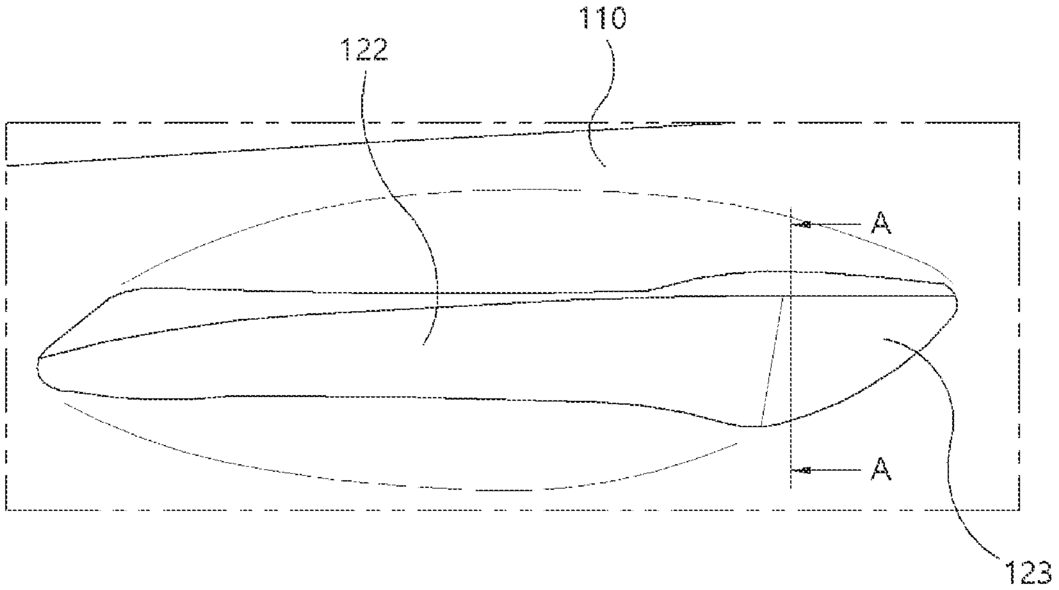
FIG.1A PRIOR ART
FIG. 1A is a front diagram illustrating a door outside handle assembly according to an exemplary embodiment of the related art.
Figure 1B:
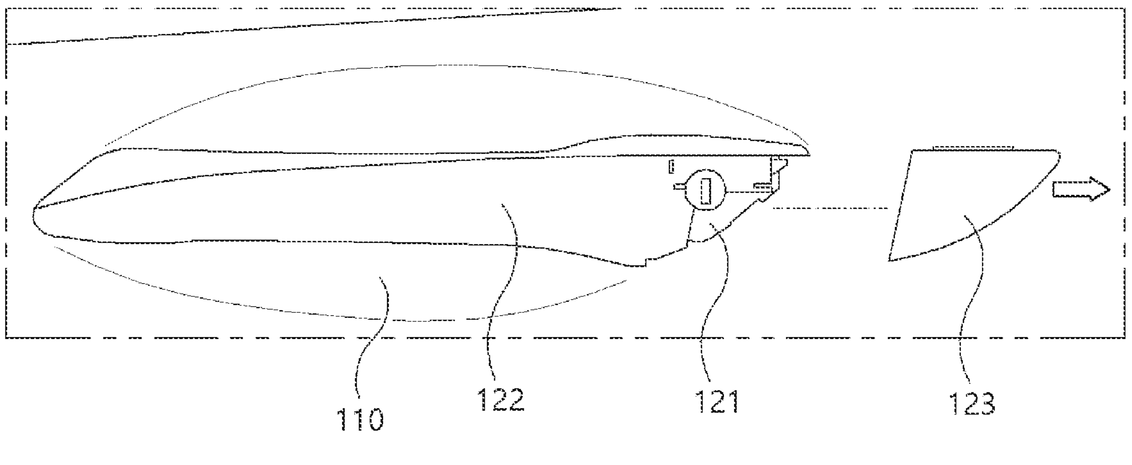
FIG.1B PRIOR ART
FIG. 1B is a front diagram illustrating a state where a door lock cap is opened in the door outside handle assembly according to the exemplary embodiment of the related art.
Figure 2:
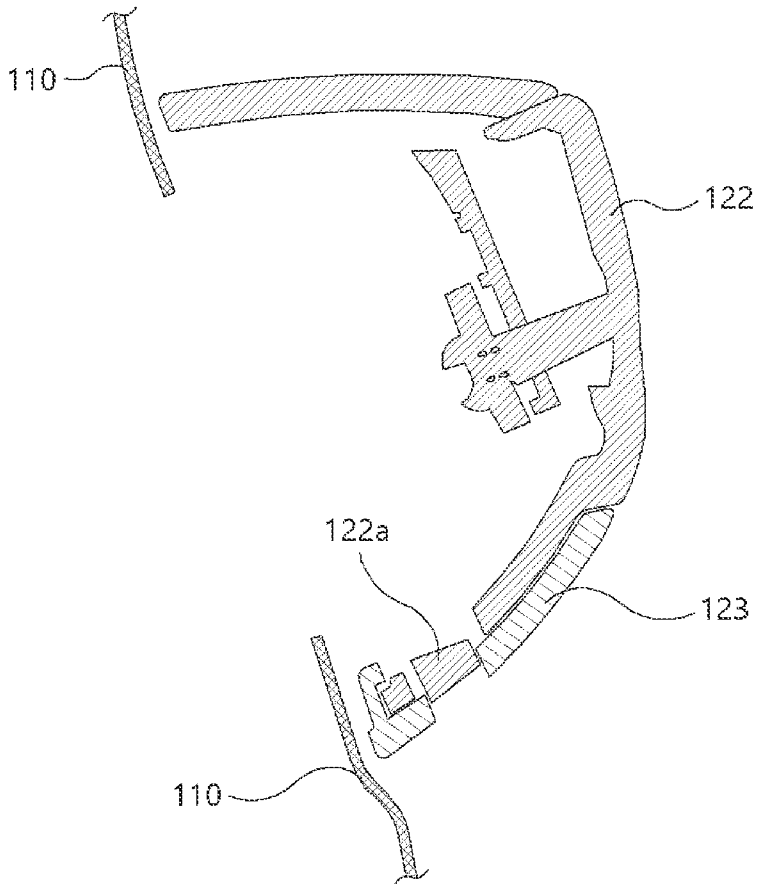
FIG.2 PRIOR ART
FIG. 2 is a cross-sectional diagram taken along line A-A in FIG. 1A.
Figure 3A:
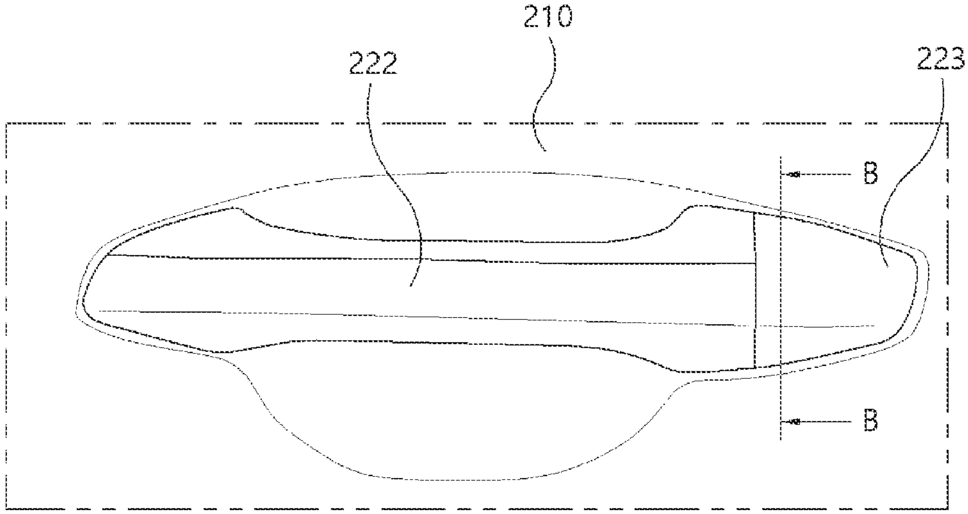
FIG.3A PRIOR ART
FIG. 3A is a front diagram illustrating a door outside handle assembly according to another exemplary embodiment of the related art.
Figure 3B:
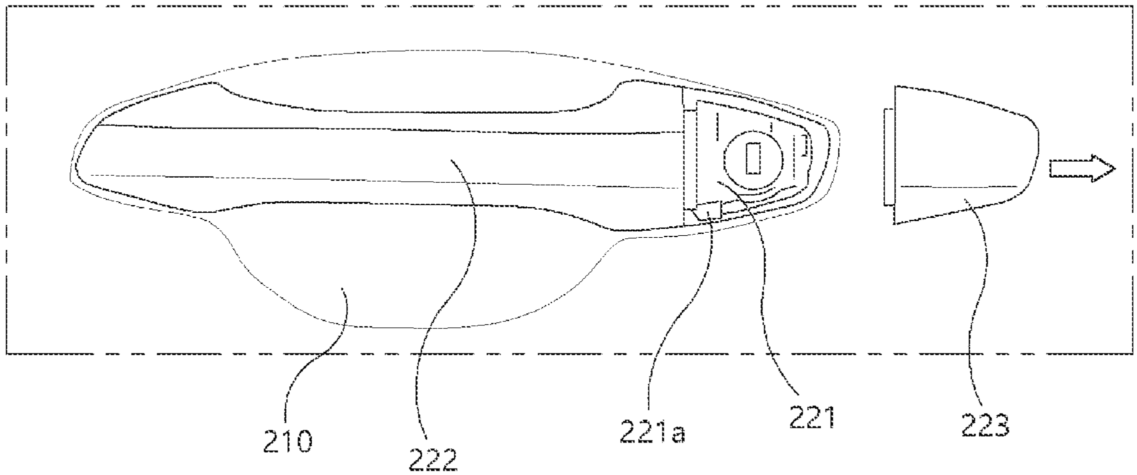
FIG.3B PRIOR ART
FIG. 3B is a front diagram illustrating a state where a door lock cap is opened in the door outside handle assembly according to another exemplary embodiment of the related art.
Figure 4:
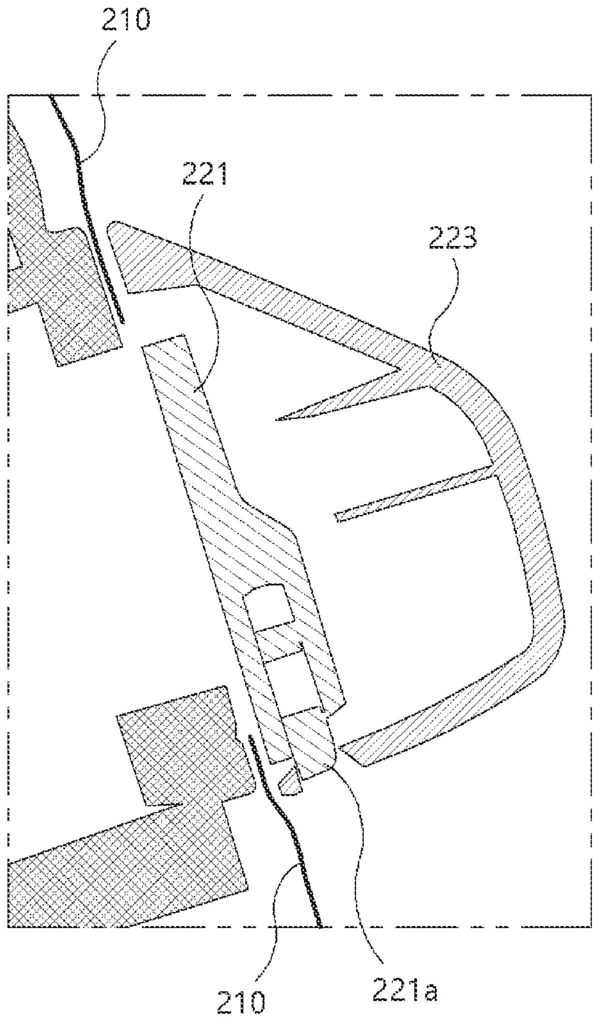
FIG.4 PRIOR ART
FIG. 4 is a cross-sectional diagram taken along line B-B in FIG. 3A.
Figure 5:
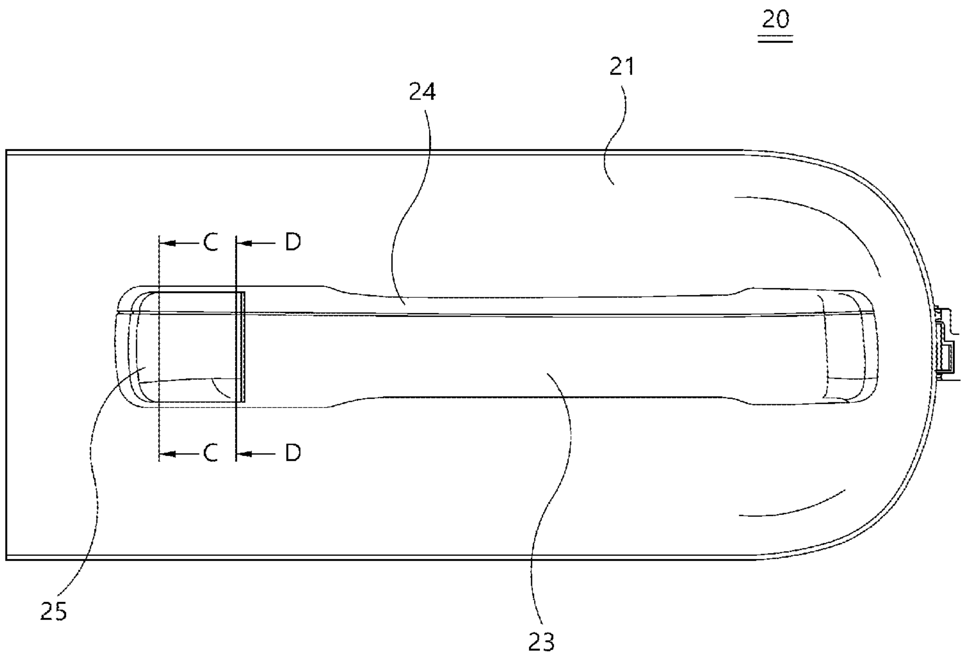
FIG. 5 is a front diagram illustrating a door outside handle assembly having a sliding type door lock cap according to an exemplary embodiment of the present disclosure.
Figure 6:
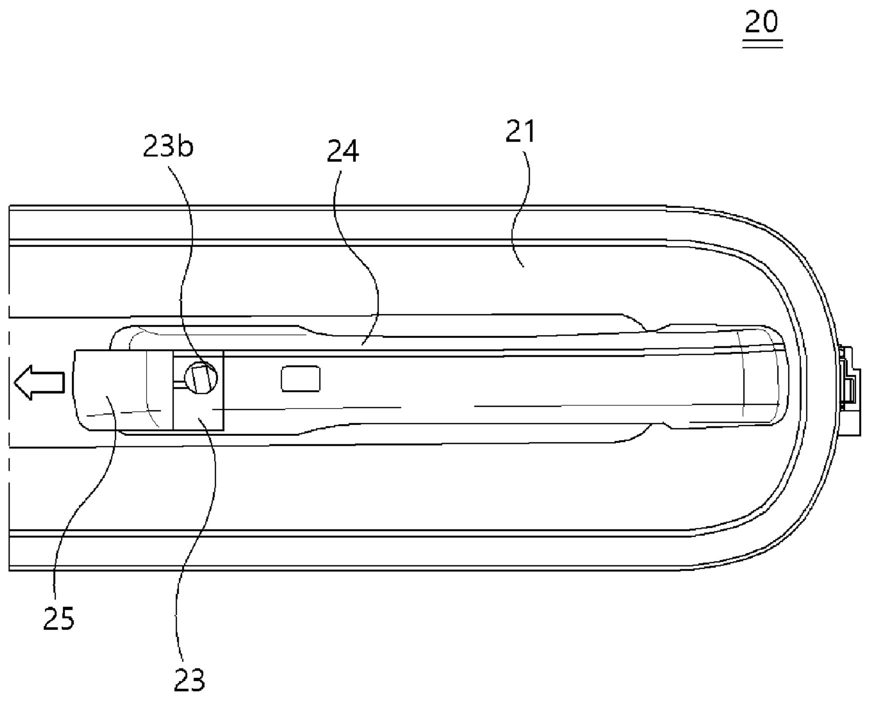
FIG. 6 is a front diagram illustrating a state where a door lock cap is opened in the door outside handle assembly having the sliding type door lock cap according to the exemplary embodiment of the present disclosure.
Figure 7:
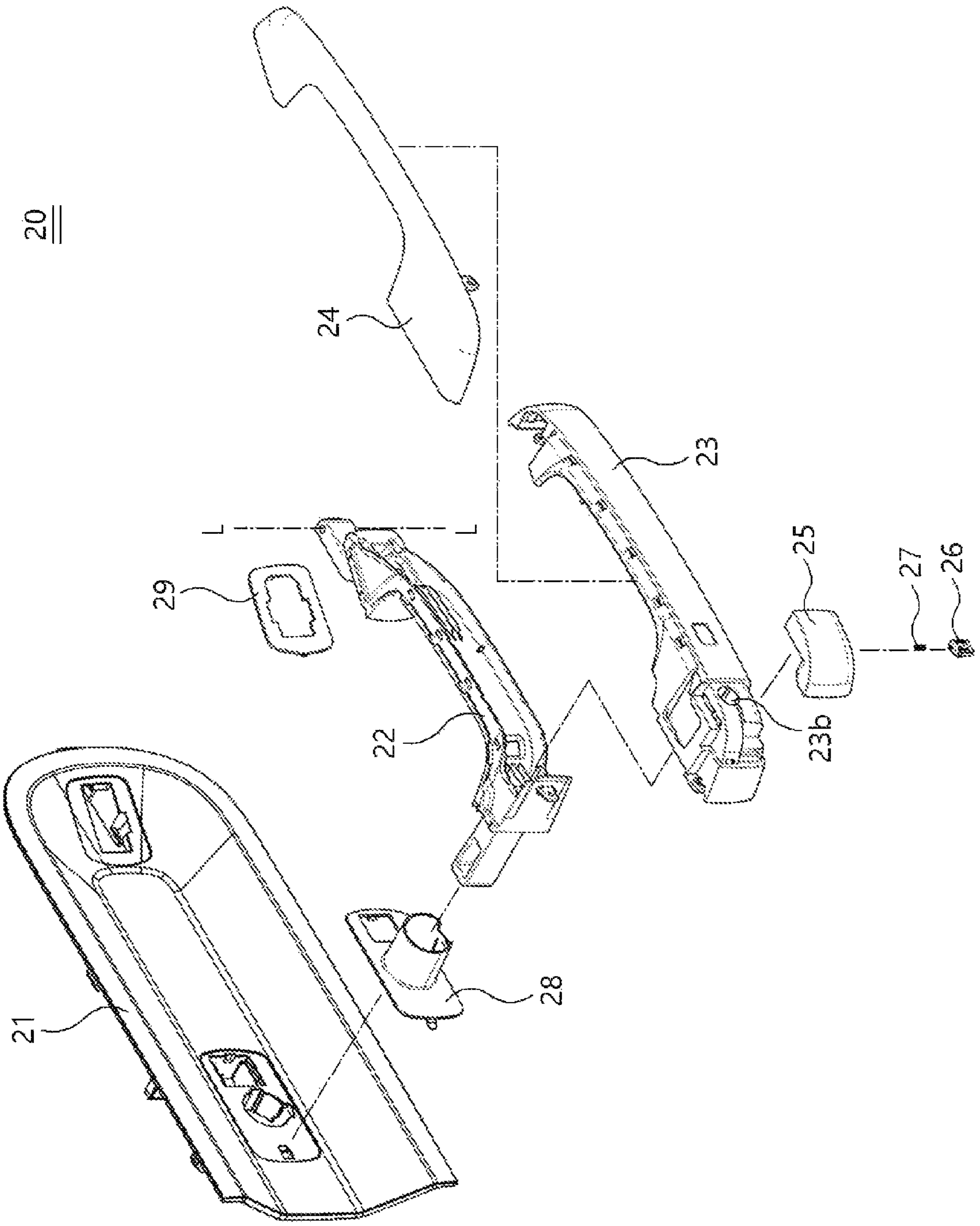
FIG. 7 is a diagram illustrating the door outside handle assembly having the sliding type door lock cap according to an exemplary embodiment of the present disclosure.

Hereinafter, a door outside handle assembly having a sliding type door lock cap according to embodiments of the present disclosure will be described in detail with reference to the accompanying drawings.

A door outside handle assembly 20 according to embodiments of the present disclosure includes a door lock body 22 attached to an outside of a door panel of a vehicle, a grip cover 23, 24 formed with a key hole 23*b* through which an emergency key passes, and covering an outside of the door lock body 22, and a door lock cap 25 installed on the outside of the grip cover 23, 24 to be slidable in a longitudinal direction of the vehicle to open or close the key hole 23*b*.

FIGS. 5 to 10C illustrate a door outside handle assembly having a sliding type door lock cap according to an exemplary embodiment of the present disclosure.

A housing 21 is installed on the door panel. The housing 21 may also be separately installed on the door panel, but the door outside handle assembly may also be directly installed on the door panel without the housing 21 by pressing a region where the door outside handle assembly is to be installed on the door panel.

The door lock body 22 is installed on the housing 21 or the door panel such that the door is directly locked or unlocked by an operation of an emergency key.

The grip cover 23, 24 covers the outside of the door lock body 22. The grip cover 23, 24 is composed of a main grip cover 23 assembled to an outside of a lower portion of the door lock body 22 to cover the lower portion for the door lock body 22, and a sub grip cover 24 assembled on an upper portion of the main grip cover 23, and covering an upper portion of the door lock body 22. The main grip cover 23 and the sub grip cover 24 are coupled to the outside of the door lock body 22, such that the door lock body 22 is not exposed to the outside, and forms the appearance by the main grip cover 23 and the sub grip cover 24.

The door lock cap 25 is slidably installed on one side of the grip cover 23, 24 and in a section where the key hole 23*b* through which the emergency key passes is formed in the grip cover 23, 24. According to the present exemplary embodiment, the door lock cap 25 is slidably installed on the main grip cover 23 side. The door lock cap 25 is installed on only the main grip cover 23 side, and is not installed on the sub grip cover 24 side. However, an upper surface of the door lock cap 25 contacts a bottom surface of the sub grip cover 24.

A slot 23*a* is formed in the main grip cover 23 in a sliding direction of the door lock cap 25 such that the door lock cap 25 is slidable on the main grip cover 23. Since the door lock cap 25 slides in a longitudinal direction of the vehicle, the slot 23*a* is formed at a predetermined length in the longitudinal direction of the vehicle.

Figure 9:
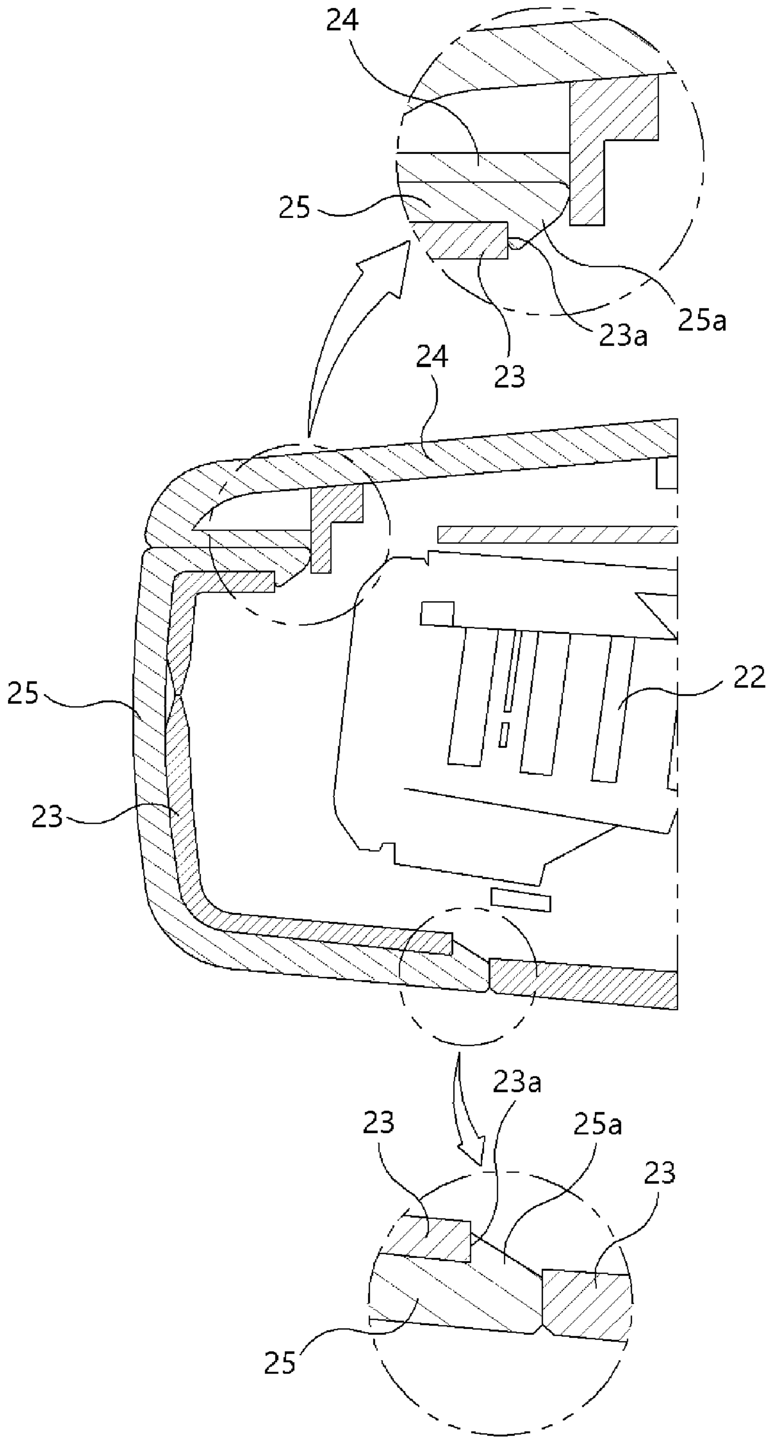
FIG. 9 is a cross-sectional diagram taken along line D-D in FIG. 5.

Further, as illustrated in FIG. 9, the door lock cap 25 has a cross section formed in a form of surrounding the main grip cover 23, and each of upper and lower ends of the door lock cap 25 is formed with a locking hook 25*a* inserted into the slot 23*a*. The locking hook 25*a* is formed at a predetermined length from the end of the door lock cap 25. The locking hook 25*a* serves to fix the door lock cap 25 to the main grip cover 23, and is also inserted into the slot 23*a* to serve to guide the sliding of the door lock cap 25. While the door lock cap 25 surrounds a portion where the key hole 23*b* is formed in the main grip cover 23, the locking hooks 25*a* formed on the upper and lower ends of the door lock cap 25 are fitted into the slots 23*a* formed in the main grip cover 23, such that the door lock cap 25 is slidably installed on the main grip cover 23. Therefore, the door lock cap 25 is installed in a state of gripping the outside of the main grip cover 23.

Here, since the slot 23*a* is formed at the predetermined length, the door lock cap 25 moves by only a certain distance, thereby preventing the door lock cap 25 from being separated from the main grip cover 23 by the sliding. For example, FIG. 10C illustrates that the slot 23*a* is formed at a length of S1, when a length of the locking hook 25*a* is H1, the door lock cap 25 may slide by 'S1-H1'. Further, when sliding as much as possible, the door lock cap 25 may not slide any more, thereby maintaining a state of being locked to the main grip cover 23.

Figure 8:
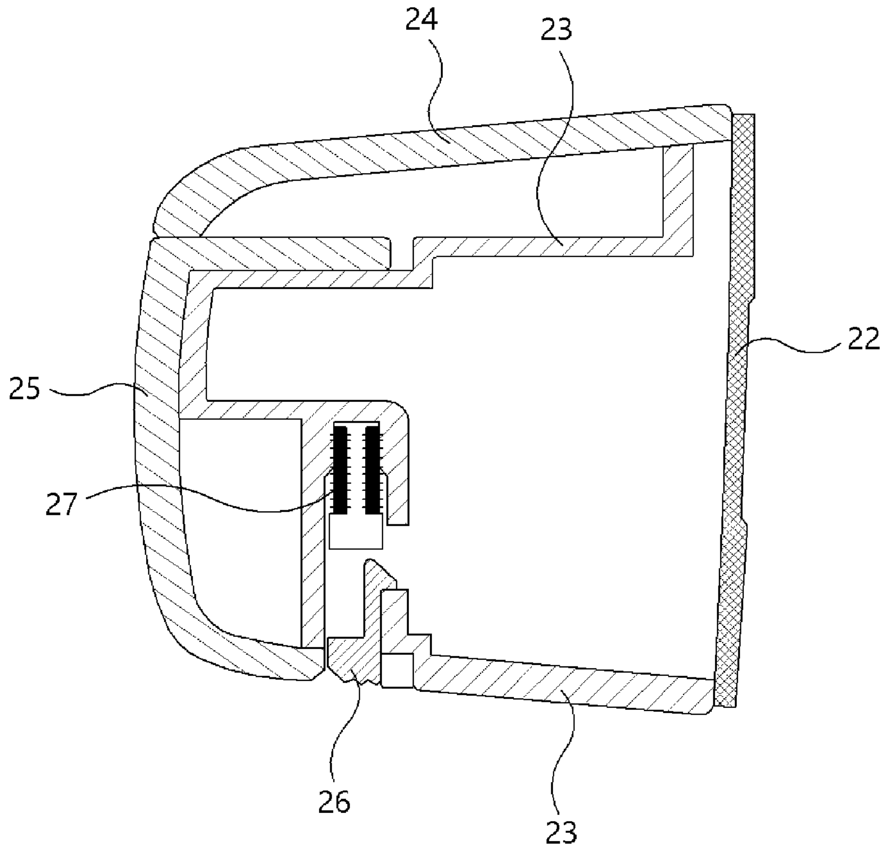
FIG. 8 is a cross-sectional diagram taken along line C-C in FIG. 5.

A cap button 26 is installed to be slidable downward inside the door lock body 22, and a button spring 27 having a coil spring form for elastically supporting the cap button 26 is installed inside the cap button 26 and the main grip cover 23 (see FIG. 8). The cap button 26 is installed on the door lock body 22 to slide in a direction different from the sliding direction of the door lock cap 25 to constrain the sliding of the door lock cap 25. Since the door lock cap 25 slides in the longitudinal direction of the vehicle, the cap button 26 is preferably installed to be slidable in a vertical direction of the vehicle, which is a direction perpendicular to the sliding direction of the door lock cap 25. The button spring 27 elastically supports the cap button 26 downward, and therefore, the cap button 26 is positioned to be inserted into a button hole 25*b* formed in the door lock cap 25 such that the cap button 26 normally constrains the door lock cap 25 to maintain a state where the door lock cap 25 closes the key hole 23*b*.

An internal pad 28 is provided between the housing 21 and the door lock body 22.

On the door lock body 22, when a user pulls the door lock body 22, an opposite side into which the emergency key is inserted becomes a rotating axis (see line L-L) around which the door outside handle assembly 20 rotates, and a hinge pad 29 is provided between the above portion and an inside of the housing 21 or an inside of the door panel.

Figure 10A:
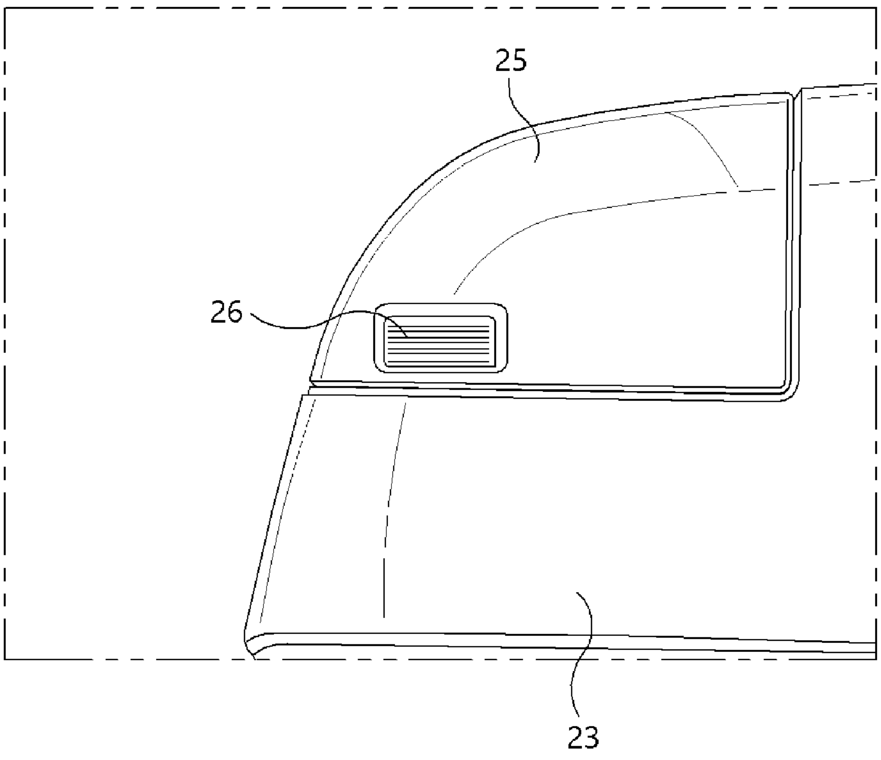
FIGS. 10A to 10C are bottom diagrams illustrating a state where the door outside handle assembly having the sliding type door lock cap according to an exemplary embodiment of the present disclosure is opened.
Figure 10B:
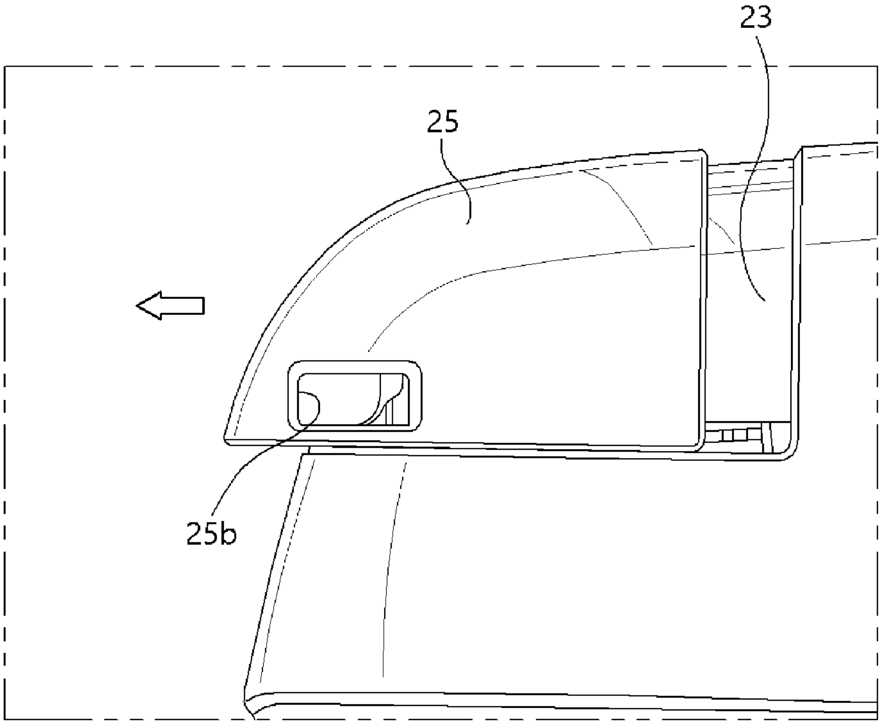
Figure 10C:
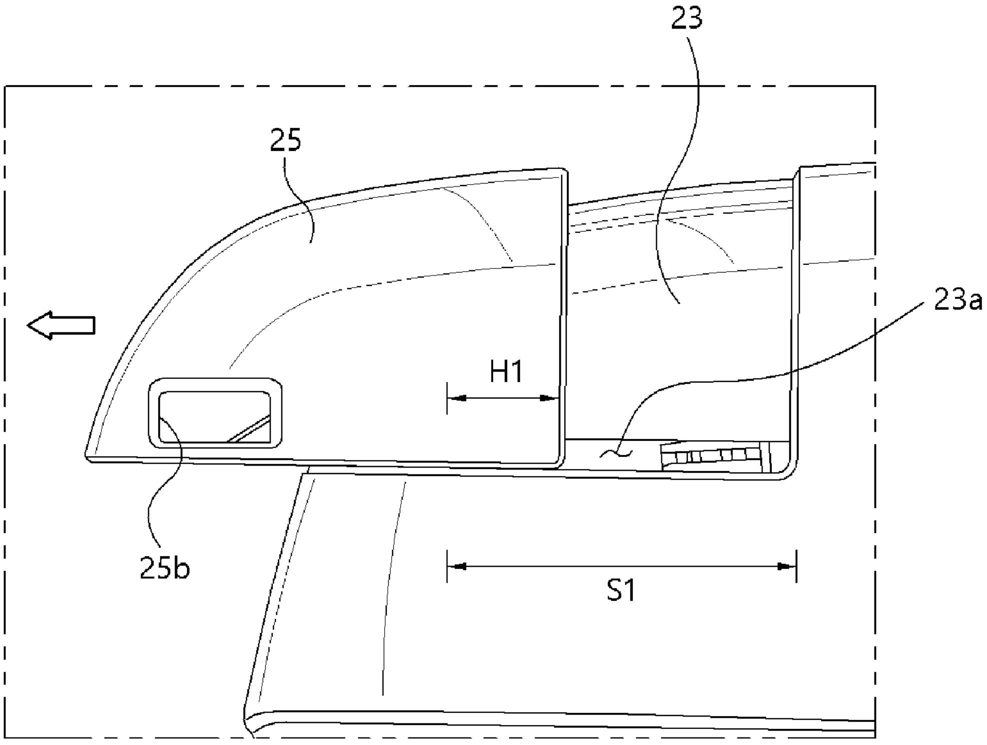
Figure 11:
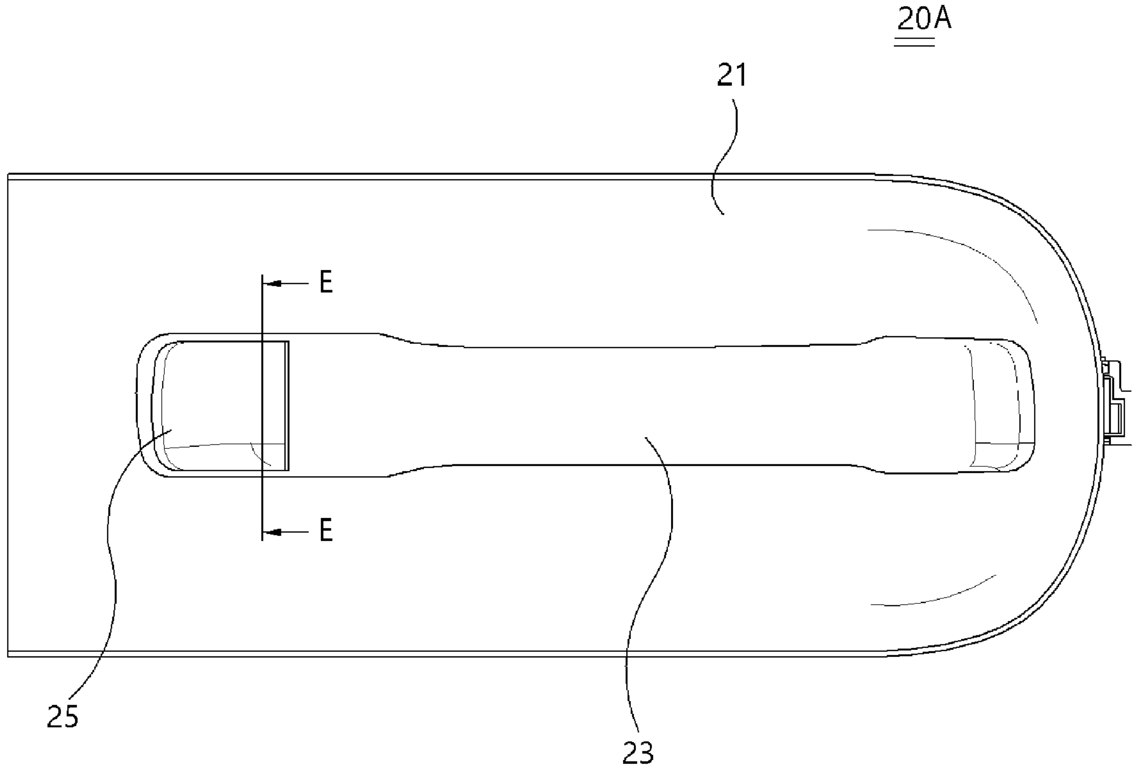
FIG. 11 is a front diagram illustrating a door outside handle assembly having a sliding type door lock cap according to another exemplary embodiment of the present disclosure.
Figure 12:
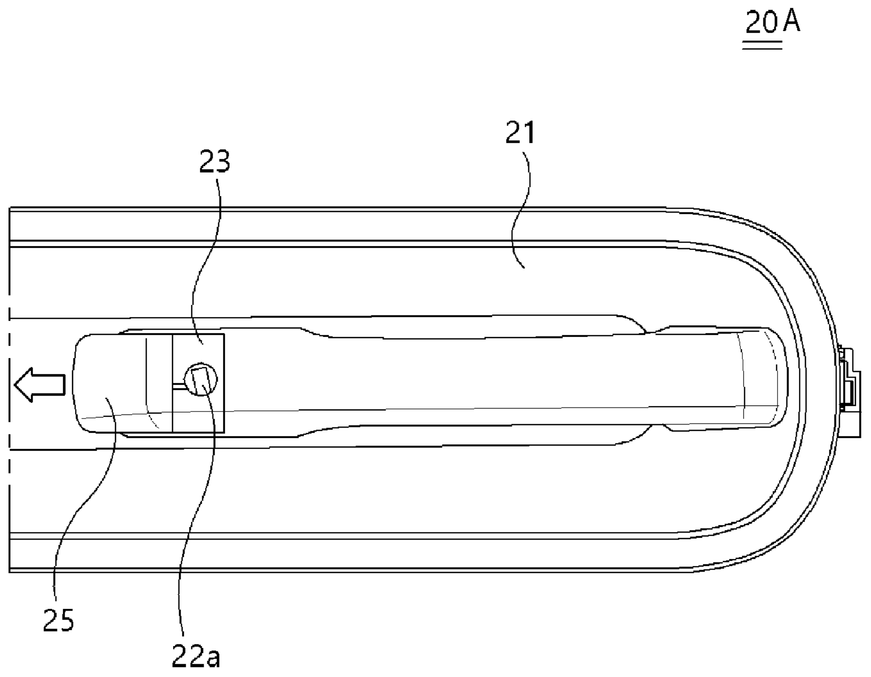
FIG. 12 is a front diagram illustrating a state where a door lock cap is opened in the door outside handle assembly having the sliding type door lock cap according to another exemplary embodiment of the present disclosure.
Figure 13:
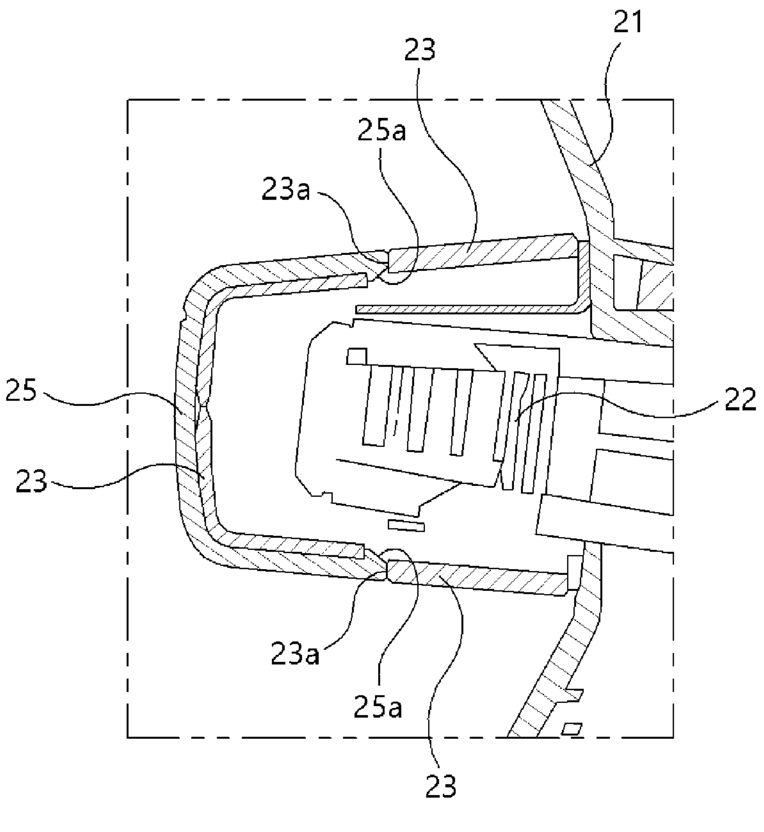
FIG. 13 is a cross-sectional diagram taken along line E-E in FIG. 11.

FIGS. 10A to 10C illustrate operating states of the door outside handle assembly 20 according to the exemplary embodiment of the present disclosure.

In the state where the door lock cap 25 is closed (see FIG. 10A), the cap button 26 is pressed by the emergency key or the like such that the cap button 26 releases the constraint of the sliding of the door lock cap 25. When the cap button 26 is pressed, the cap button 26 is separated from the button hole 25*b* of the door lock cap 25. Therefore, the door lock cap 25 is slidable.

When releasing the constraint of the door lock cap 25, the cap button 26 forces the door lock cap 25 to slide (see FIG. 10B).

Thereafter, when the door lock cap 25 slides as much as possible (see FIG. 10C), one side of the door lock body 22 is opened such that the door lock cap 25 may be operated by inserting the emergency key in the door lock body 22. Meanwhile, since the door lock cap 25 is moved up to the end of the slot 23*a* formed in the main grip cover 23 and the door lock cap 25 grips the main grip cover 23, the door lock cap 25 is not separated from the main grip cover 23.

Meanwhile, the process of closing the key hole 23*b* with the door lock cap 25 is performed in a reverse order of the above. When the door lock cap 25 is completely assembled and the door lock cap 25 completely closes the key hole 23*b*, the cap button 26 is inserted into the button hole 25*b* again. At this time, a 'click' sound may occur, thereby making it easy to recognize the assembly completion of the door lock cap 25.

Meanwhile, FIGS. 11 to 14B illustrate a door outside handle assembly 20 having a sliding type door lock cap according to another exemplary embodiment of the present disclosure.

A basic configuration of the door outside handle assembly 20A according to the present exemplary embodiment is the same as that of the door outside handle assembly 20 according to the exemplary embodiment described above.

According to the present exemplary embodiment, the grip cover is not divided into the main grip cover and the sub grip cover, and the door lock body 22 is surrounded by one grip cover 23. In other words, the door lock body 22 is surrounded by only the main grip cover 23.

The slot 23*a* through which the door lock cap 25 slides is formed in the main grip cover 23. The locking hook 25*a* is formed on each of the upper and lower ends of the door lock cap 25, and the locking hook 25*a* is also inserted into the upper and lower portions of the main grip cover 23. Therefore, the slot 23*a* for guiding the sliding of the door lock cap 25 is formed in each of the upper and lower portions of the main grip cover 23.

Since the slot 23*a* is formed at the predetermined length, the door lock cap 25 slides by a certain distance from the state of closing the key hole 23*b* formed in the main grip cover 23 such that the key hole 23*b* is opened. In other words, as illustrated in FIG. 14B, when the slot 23*a* is formed as a length of S2 and a length of the locking hook 25*a* is H2, the door lock cap 25 may slide by 'S2-H2'.

Figure 14A:
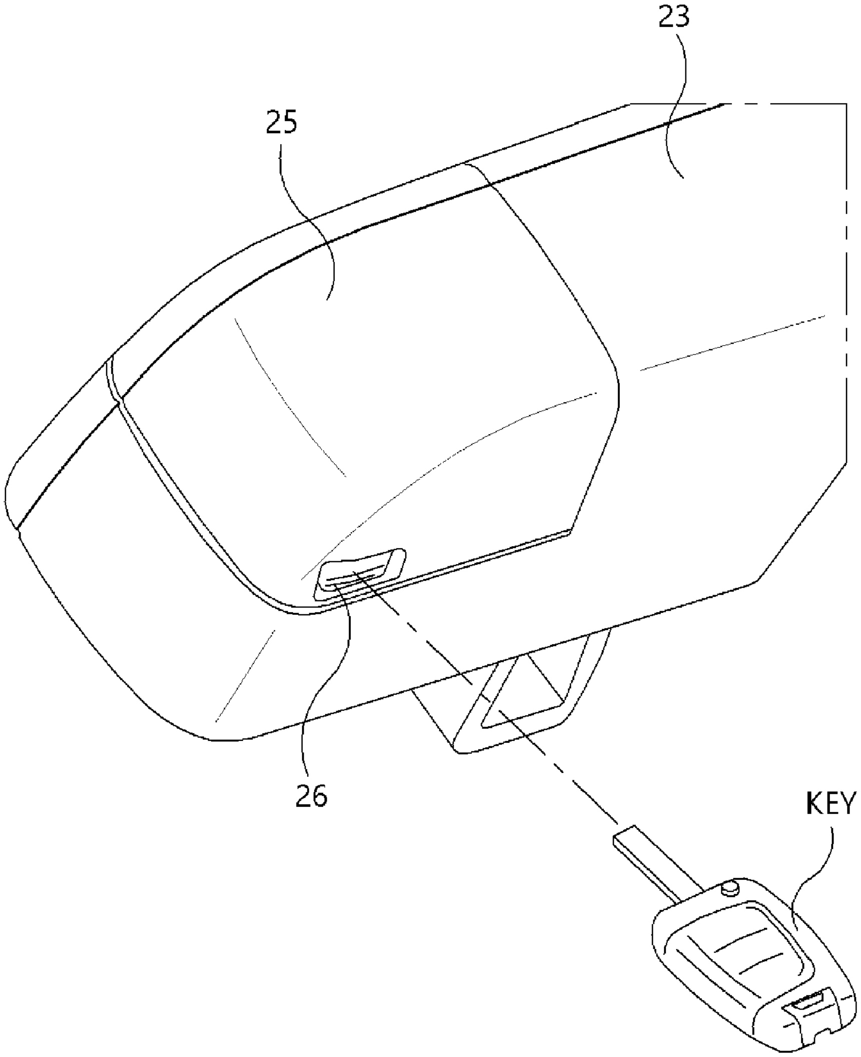
FIG. 14A is a bottom perspective diagram illustrating a state before the door lock cap is opened in the door outside handle assembly having the sliding type door lock cap according to another exemplary embodiment of the present disclosure.
Figure 14B:
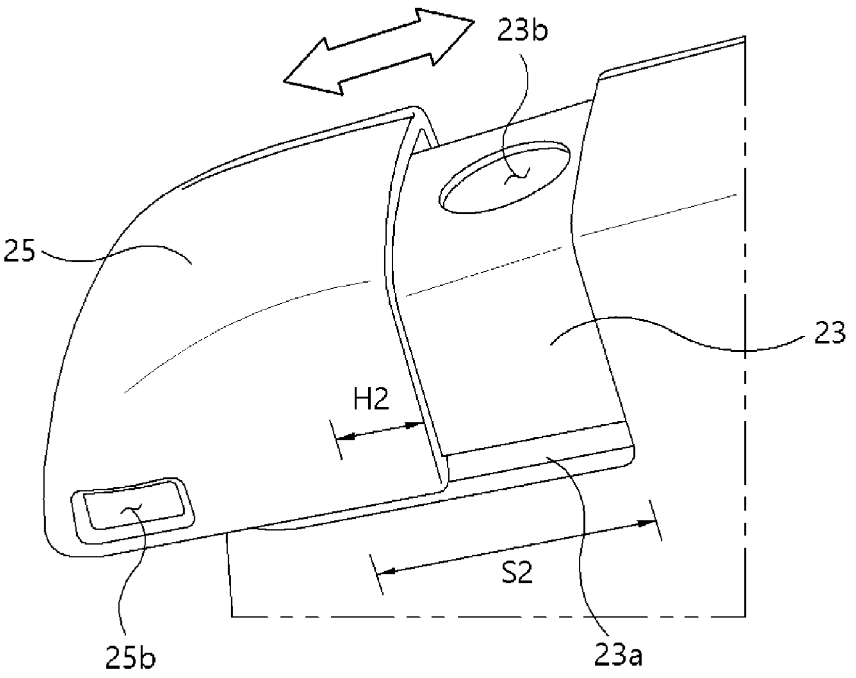
FIG. 14B is a bottom perspective diagram illustrating a state where the door lock cap is opened in the door outside handle assembly having the sliding type door lock cap according to another exemplary embodiment of the present disclosure.

FIGS. 14A and 14B illustrate operating states of the door outside handle assembly 20A according to the present exemplary embodiment.

As illustrated in FIG. 14A, in the state where the door lock cap 25 closes the key hole 23*b*, the cap button 26 is pressed by the emergency key to move the door lock cap 25. When the cap button 26 is pressed, the cap button 26 is separated from the button hole 25*b*, such that the door lock cap 25 is slidable.

Thereafter, the door lock cap 25 is slid. When the door lock cap 25 slides as much as possible, the key hole 23*b* is opened and the door lock body 22 is operated by the emergency key to lock or unlock the door. The door lock cap 25 slides to open the key hole 23*b*, but the locking hook 25*a* formed on the door lock cap 25 is locked to the slot 23*a*. Therefore, the door lock cap 25 may not be separated from the main grip cover 23, thereby preventing the door lock cap 25 from being lost or damaged.

Meanwhile, the process of closing the key hole 23*b* with the door lock cap 25 is performed in a reverse order from the above. When the door lock cap 25 completely closes the key hole 23*b*, as the cap button 26 is inserted into the button hole 25*b* again, the 'click' sound may occur, thereby making it easy to recognize the assembly completion of the door lock cap 25.

What is claimed is:

1. A door outside handle assembly comprising:

a door lock body configured to be attached to an outside of a door panel of a vehicle;

a grip cover covering an outside of the door lock body and including a key hole configured to receive an emergency key, wherein the grip cover comprises a main grip cover assembled to a lower portion of the outside of the door lock body to cover the lower portion and a sub grip cover assembled to an upper portion of the main grip cover and covering an upper portion of the outside of the door lock body;

a door lock cap on an outside of the grip cover, the door lock cap being slidable in a longitudinal direction of the vehicle to cover or uncover the key hole;

a slot on the grip cover in a section where the key hole is provided, wherein the slot has a predetermined length in the longitudinal direction of the vehicle; and a locking hook on the door lock cap, the locking hook configured to be inserted into the slot and to force the door lock cap to cover the grip cover;

wherein the slot comprises a first slot and a second slot and the locking hook comprises a first locking hook and a second locking hook;

wherein the first slot is provided in an upper portion of the main grip cover and the second slot is provided in a lower portion of the main grip cover;

wherein the first locking hook is provided on an upper end of the door lock cap and the second locking hook is provided on a lower end of the door lock cap; and wherein the first and second locking hooks prevent the door lock cap from being separated from the main grip cover regardless of the position of the door lock cap.

2. The assembly of claim 1, wherein the door lock cap surrounds the grip cover, and upper and lower ends of the door lock cap are fitted into and fixed to the slot.

3. The assembly of claim 1, wherein the door lock cap is configured to maintain a state where the locking hook is locked to the slot, after the locking hook slides in the slot to uncover the key hole.

4. The assembly of claim 1, wherein:

the slot is in the main grip cover; and the door lock cap is coupled to the main grip cover.

5. The assembly of claim 1, wherein an upper surface of the door lock cap contacts a bottom surface of the sub grip cover.

6. The assembly of claim 1, further comprising:

a cap button provided on the door lock body and configured to be slidable in a direction different from a sliding direction of the door lock cap to constrain sliding of the door lock cap; and a button spring provided between the door lock body and the cap button and configured to elastically support the cap button.

7. The assembly of claim 6, wherein the direction different from the sliding direction of the door lock cap is a vertical direction of the vehicle.

8. The assembly of claim 6, further comprising a button hole provided in a lower surface of the door lock cap, wherein the button hole is configured to receive the cap button, and wherein the cap button is configured to be inserted into the button hole when the door lock cap covers the key hole.

9. The assembly of claim 1, wherein:

the door panel is provided with a housing; and the door lock body is configured to be fastened to the housing.

10. A door outside handle assembly, the assembly comprising:

a door lock body configured to be attached to an outside of a door panel of a vehicle;

a grip cover covering an outside of the door lock body and including a key hole configured to receive an emergency key, wherein the grip cover comprises a main grip cover assembled to a lower portion of the outside of the door lock body to cover the lower portion and a sub grip cover assembled to an upper portion of the main grip cover and covering an upper portion of the outside of the door lock body;

a door lock cap on an outside of the grip cover, the door lock cap being slidable in a longitudinal direction of the vehicle to cover or uncover the key hole, wherein the door lock cap is slidable only in a predetermined section of the grip cover;

a slot on the grip cover in a section where the key hole is provided, wherein the slot has a predetermined length in the longitudinal direction of the vehicle; and a locking hook on the door lock cap, the locking hook configured to be inserted into the slot and to force the door lock cap to cover the grip cover;

wherein the slot comprises a first slot and a second slot and the locking hook comprises a first locking hook and a second locking hook;

wherein the first slot is provided in an upper portion of the main grip cover and the second slot is provided in a lower portion of the main grip cover;

wherein the first locking hook is provided on an upper end of the door lock cap and the second locking hook is provided on a lower end of the door lock cap; and wherein the first and second locking hooks prevent the door lock cap from being separated from the main grip cover regardless of the position of the door lock cap.

11. The assembly of claim 10, wherein the door lock cap is configured to maintain a state where the locking hook is locked to the slot, after the locking hook slides in the slot to uncover the key hole.

12. The assembly of claim 10, wherein:

the slot is in the main grip cover; and the door lock cap is coupled to the main grip cover.

13. The assembly of claim 10, wherein an upper surface of the door lock cap contacts a bottom surface of the sub grip cover.

14. The assembly of claim 10, further comprising:

a cap button provided on the door lock body and configured to be slidable in a direction different from a sliding direction of the door lock cap to constrain sliding of the door lock cap; and a button spring provided between the door lock body and the cap button and configured to elastically support the cap button.

15. The assembly of claim 14, wherein the direction different from the sliding direction of the door lock cap is a vertical direction of the vehicle.

16. The assembly of claim 14, further comprising a button hole provided in a lower surface of the door lock cap, wherein the button hole is configured to receive the cap button, and wherein the cap button is configured to be inserted into the button hole when the door lock cap covers the key hole.

17. The assembly of claim 10, wherein:

the door panel is provided with a housing; and the door lock body is configured to be fastened to the housing.

18. A vehicle comprising:

a vehicle body;

a vehicle door coupled to the vehicle body, the vehicle door comprising a door panel;

a door lock body attached to an outer surface of the door panel;

a grip cover covering an outside of the door lock body and including a key hole configured to receive an emergency key, wherein the grip cover comprises a main grip cover assembled to a lower portion of the outside of the door lock body to cover the lower portion and a sub grip cover assembled to an upper portion of the main grip cover and covering an upper portion of the outside of the door lock body;

a door lock cap on an outside of the grip cover, the door lock cap being slidable in a longitudinal direction of the vehicle to cover or uncover the key hole;

a slot on the grip cover in a section where the key hole is provided, wherein the slot has a predetermined length in the longitudinal direction of the vehicle; and a locking hook on the door lock cap, the locking hook configured to be inserted into the slot and to force the door lock cap to cover the grip cover;

wherein the slot comprises a first slot and a second slot and the locking hook comprises a first locking hook and a second locking hook;

wherein the first slot is provided in an upper portion of the main grip cover and the second slot is provided in a lower portion of the main grip cover;

wherein the first locking hook is provided on an upper end of the door lock cap and the second locking hook is provided on a lower end of the door lock cap; and wherein the first and second locking hooks prevent the door lock cap from being separated from the main grip cover regardless of the position of the door lock cap.

19. The vehicle of claim 18, wherein the door lock cap surrounds the grip cover, and upper and lower ends of the door lock cap are fitted into and fixed to the slot.

* * * * *